United States Patent
Yang et al.

(10) Patent No.: US 9,900,879 B2
(45) Date of Patent: Feb. 20, 2018

(54) METHOD AND APPARATUS FOR TRANSMITTING CONTROL INFORMATION IN WIRELESS COMMUNICATION SYSTEM

(71) Applicant: LG ELECTRONICS INC., Seoul (KR)

(72) Inventors: Suckchel Yang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/123,983

(22) PCT Filed: Mar. 6, 2015

(86) PCT No.: PCT/KR2015/002184
§ 371 (c)(1),
(2) Date: Sep. 6, 2016

(87) PCT Pub. No.: WO2015/133860
PCT Pub. Date: Sep. 11, 2015

(65) Prior Publication Data
US 2017/0019884 A1    Jan. 19, 2017

Related U.S. Application Data

(60) Provisional application No. 61/948,567, filed on Mar. 6, 2014, provisional application No. 61/950,821, filed
(Continued)

(51) Int. Cl.
H04W 72/04 (2009.01)
H04B 7/26 (2006.01)
(Continued)

(52) U.S. Cl.
CPC ............ *H04W 72/042* (2013.01); *H04B 7/26* (2013.01); *H04L 1/1812* (2013.01); *H04L 5/14* (2013.01); *H04L 27/2607* (2013.01)

(58) Field of Classification Search
CPC ..... H04B 7/26; H04L 1/1812; H04L 27/2607; H04L 5/14; H04W 72/042
See application file for complete search history.

(56) References Cited

U.S. PATENT DOCUMENTS

2013/0021954 A1*  1/2013  Montojo ................ H04L 5/14
                                                370/295
2014/0022962 A1*  1/2014  Yang .................... H04L 5/0055
                                                370/280
(Continued)

FOREIGN PATENT DOCUMENTS

WO    2013066091    5/2013

OTHER PUBLICATIONS

NEC, "PUCCH and PHICH resource reservation for TDD eIMTA system," 3GPP TSG-RAN WG1 #76, R1-140481, Jan. 2014, 4 pages.
(Continued)

*Primary Examiner* — Khaled Kassim
*Assistant Examiner* — Syed S Ali
(74) *Attorney, Agent, or Firm* — Lee, Hong, Degerman, Kang & Waimey PC

(57) ABSTRACT

The present invention relates to a wireless communication system. Specifically, the present invention provides a method for receiving control information by a terminal and an apparatus therefor, the method comprising the steps of: receiving an upper layer signal having first UL-DL configuration information for a TDD cell; receiving a lower layer signal having second UL-DL configuration information for the TDD cell; receiving a DL signal in subframe i of the
(Continued)

TDD cell according to the second UL-DL configuration information; and detecting the control information on the basis of the number of PHICH groups in the subframe i.

12 Claims, 15 Drawing Sheets

Related U.S. Application Data on Mar. 10, 2014, provisional application No. 61/977,606, filed on Apr. 9, 2014.

(51) Int. Cl.
*H04L 1/18* (2006.01)
*H04L 5/14* (2006.01)
*H04L 27/26* (2006.01)

(56) References Cited

U.S. PATENT DOCUMENTS

| | | | |
|---|---|---|---|
| 2015/0016311 A1* | 1/2015 | Han | H04W 24/10 370/280 |
| 2015/0270916 A1* | 9/2015 | Oizumi | H04W 72/0446 370/280 |
| 2015/0289261 A1* | 10/2015 | Oizumi | H04W 72/02 370/329 |
| 2016/0219595 A1* | 7/2016 | Larsson | H04L 5/001 |
| 2016/0261296 A1* | 9/2016 | Ouchi | H04W 72/12 |
| 2016/0270060 A1* | 9/2016 | Kusashima | H04L 1/1854 |
| 2016/0330011 A1* | 11/2016 | Lee | H04L 5/0066 |
| 2017/0005770 A1* | 1/2017 | Shimezawa | H04L 1/00 |
| 2017/0135091 A1* | 5/2017 | Han | H04W 72/0413 |

OTHER PUBLICATIONS

Samsung, "Remaining issues on HARQ timing for eIMTA," 3GPP TSG-RAN WG1 #76, R1-140350, Feb. 2014, 3 pages.
InterDigital, "On HARQ feedback and PUCCH resource allocation for eIMTA," 3GPP TSG-RAN WG1 #75, R1-135599, Nov. 2013, 3 pages.
Panasonic, "Remaining Details for HARQ Timing," 3GPP TSG-RAN WG1 #75, R1-135391, Nov. 2013, 2 pages.
PCT International Application No. PCT/KR2015/002184, Written Opinion of the International Searching Authority dated May 28, 2015, 16 pages.

* cited by examiner

FIG. 13

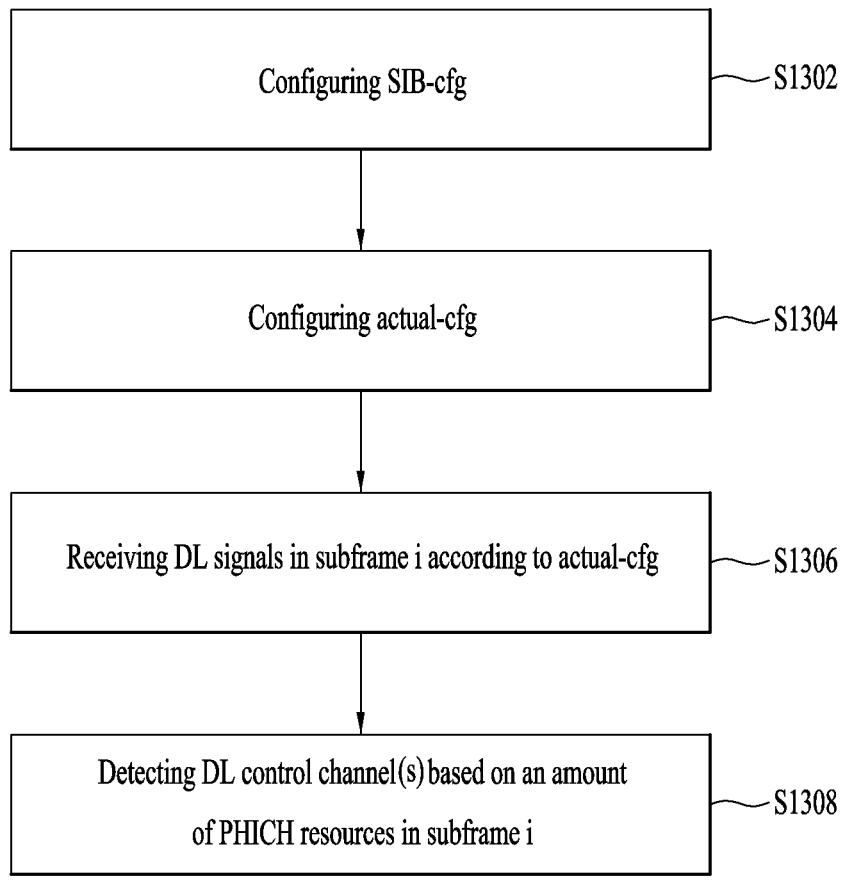

For subframe i = fixed D, PHICH resources are reserved according SIB-cfg.

For subframe i = flexible U, PHICH resources may be allocated as follows:
Alt 1-1) no PHICH resources in any flexible UL SF
Alt 1-2) reserve PHICH resources over all flexible UL SFs
Alt 1-3) reserve PHICH resources by maximum among UD-cfg
Alt 1-4) configure PHICH reservation (or not) for flexible UL SF
Alt 1-5) reserve PHICH resources according to actual-cfg

FIG. 14

|  | Normal DL SF (e.g., fixed D) | | Reconfigured DL SF (e.g., flexible U => D) | |
| --- | --- | --- | --- | --- |
|  | CSS | USS | CSS | USS |
| Alt 2-1 | O | O | X | O |
| Alt 2-2 | O | O | Configurable | O |
| Alt 2-3 | O | O | O | O |

METHOD AND APPARATUS FOR TRANSMITTING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2015/002184, filed on Mar. 6, 2015, which claims the benefit of U.S. Provisional Application No. 61/948,567, filed on Mar. 6, 2014, 61/950,821, filed Mar. 10, 2014, and 61/977,606, filed Apr. 9, 2014, the contents of which are all hereby incorporated by reference herein in their entirety.

TECHNICAL FIELD

The present invention relates to a wireless communication system and, more particularly, to a method for transmitting control information in a wireless communication system and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Task

An object of the present invention is to provide a method for transmitting/receiving control information in a wireless communication system and an apparatus for the same.

The technical problems solved by the present invention are not limited to the above technical problems and those skilled in the art may understand other technical problems from the following description.

Technical Solutions

In a first technical aspect of the present invention, provided herein is a method of receiving control information by a user equipment in a wireless communication system, including: receiving a higher layer signal having first UL-DL (Uplink-Downlink) configuration information of a TDD (Time Division Duplex) cell; receiving a lower layer signal having second UL-DL configuration information of the TDD cell; receiving a DL signal in a subframe i of the TDD cell according to the second UL-DL configuration information; and detecting the control information on the basis of the number of PHICH (Physical Hybrid ARQ Indicator Channel) groups in the subframe i, wherein the first UL-DL configuration information is used and when the subframe i is a UL subframe, a multiple used in determining the number of the PHICH groups is set to 1, and wherein when the first UL-DL configuration information is used and when the subframe i is a DL subframe, the multiple used in determining the number of the PHICH groups is determined based on the first UL-DL configuration information.

In a second technical aspect of the present invention, provided herein is a user equipment configured to receive control information in a wireless communication system, including: an RF (Radio Frequency) unit; a processor, wherein a processor is configured to receive a higher layer signal having first UL-DL (Uplink-Downlink) configuration information of a TDD (Time Division Duplex) cell, receive a lower layer signal having second UL-DL configuration information of the TDD cell, receive a DL signal in a subframe i of the TDD cell according to the second UL-DL configuration information, and detect the control information on the basis of the number of PHICH (Physical Hybrid ARQ Indicator Channel) groups in the subframe i, wherein when the first UL-DL configuration information is used and when the subframe i is a UL subframe, a multiple used in determining the number of the PHICH groups is set to 1, and wherein when the first UL-DL configuration information is used and when the subframe i is a DL subframe, the multiple used in determining the number of the PHICH groups is determined based on the first UL-DL configuration information.

Preferably, the number of the PHICH groups in the subframe i may be given by $m_i \cdot N_{PHICH}^{group}$ and $$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases},$$

where $m_i$ denotes the multiple used in determining the number of the PHICH groups, Ng denotes a constant provided by a higher layer, and $N_{RB}^{DL}$ denotes the number of RBs (Resource Blocks) on a DL band.

Preferably, the multiple used in determining the number of the PHICH groups may be determined according to the first UL-DL configuration information as follows:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Preferably, subframes of the TDD cell may be allocated according to a UL-DL configuration as follows:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

Preferably, the higher layer signal may include an RRC (Radio Resource control) signal and the lower layer signal may include a PDCCH (Physical Downlink Control Channel) signal.

Preferably, the control information may be received through a PDCCH.

Preferably, detecting the control information may include monitoring PDCCH candidates on remaining resources except PHICH resources in the subframe i.

Advantageous Effects

According to the present invention, it is possible to efficiently transmit/receive control information in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 13 illustrates a procedure for receiving control information according to the present invention;
FIG. 14 illustrates a method for configuring a search space according to the present invention.

BEST MODE FOR INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

In a wireless communication system, a user equipment (UE) receives information from a base station (BS) on downlink (DL) and transmits information to the BS on uplink (UL). In LTE(-A), DL transmission is performed using OFDMA and uplink transmission is performed using single carrier frequency division multiple access (SC-FDMA).

Figure 1:
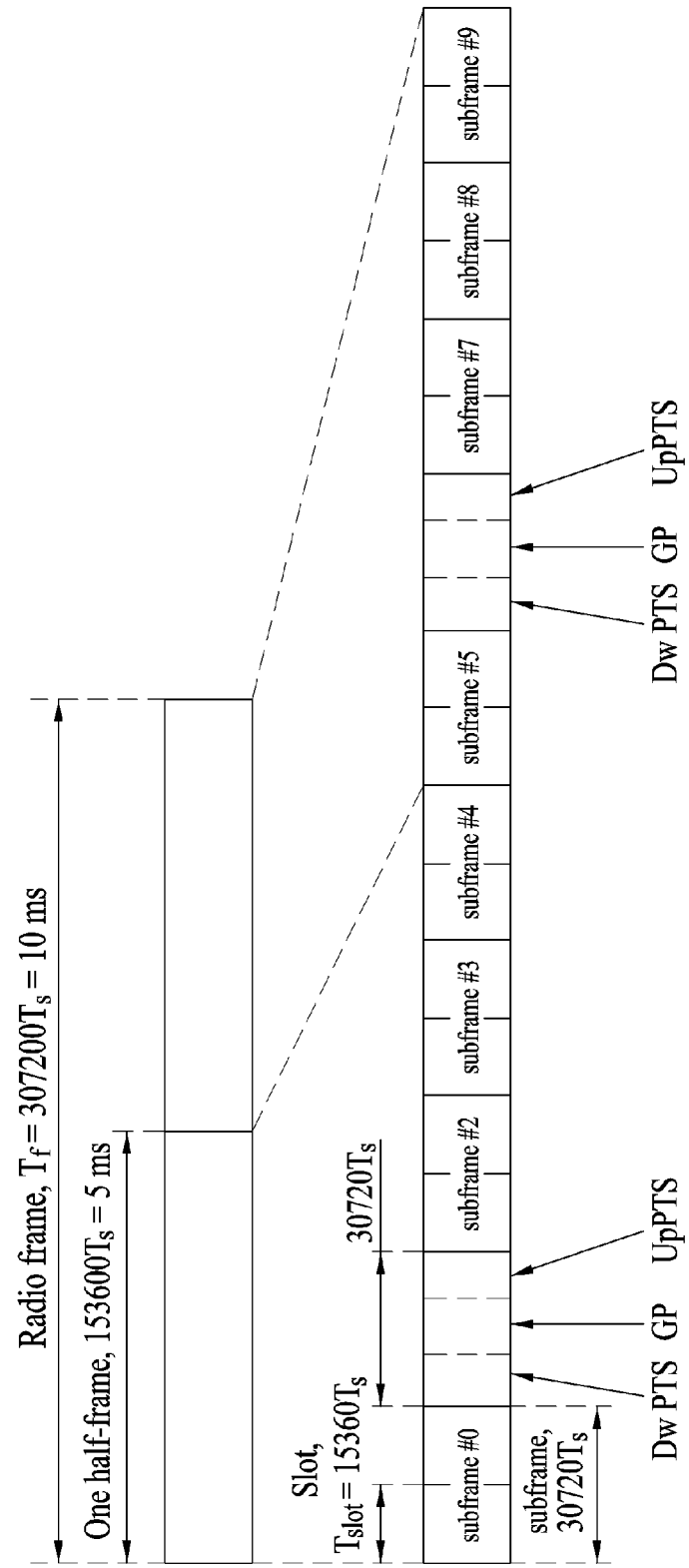
FIG. 1 illustrates a radio frame structure.

FIG. 1 illustrates a radio frame structure.

FIG. 1(a) illustrates a type-1 radio frame structure for frequency division duplex (FDD). A radio frame includes a plurality of (e.g. 10) subframes each of which includes a plurality of (e.g. 2) slots in the time domain. Each subframe has a duration of 1 ms and each slot has a duration of 0.5 ms. A slot includes a plurality of OFDM/SC-FDMA symbols in the time domain and includes a plurality of resource blocks (RBs) in the frequency domain.

FIG. 1(b) illustrates a type-2 radio frame structure for time division duplex (TDD). The type-2 radio frame includes 2 half frames. Each half frame includes 5 subframes each of which includes 2 slots.

Table 1 shows UL-DL configurations (Uplink-Downlink Configuration, UL-DL Cfg or UD-cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
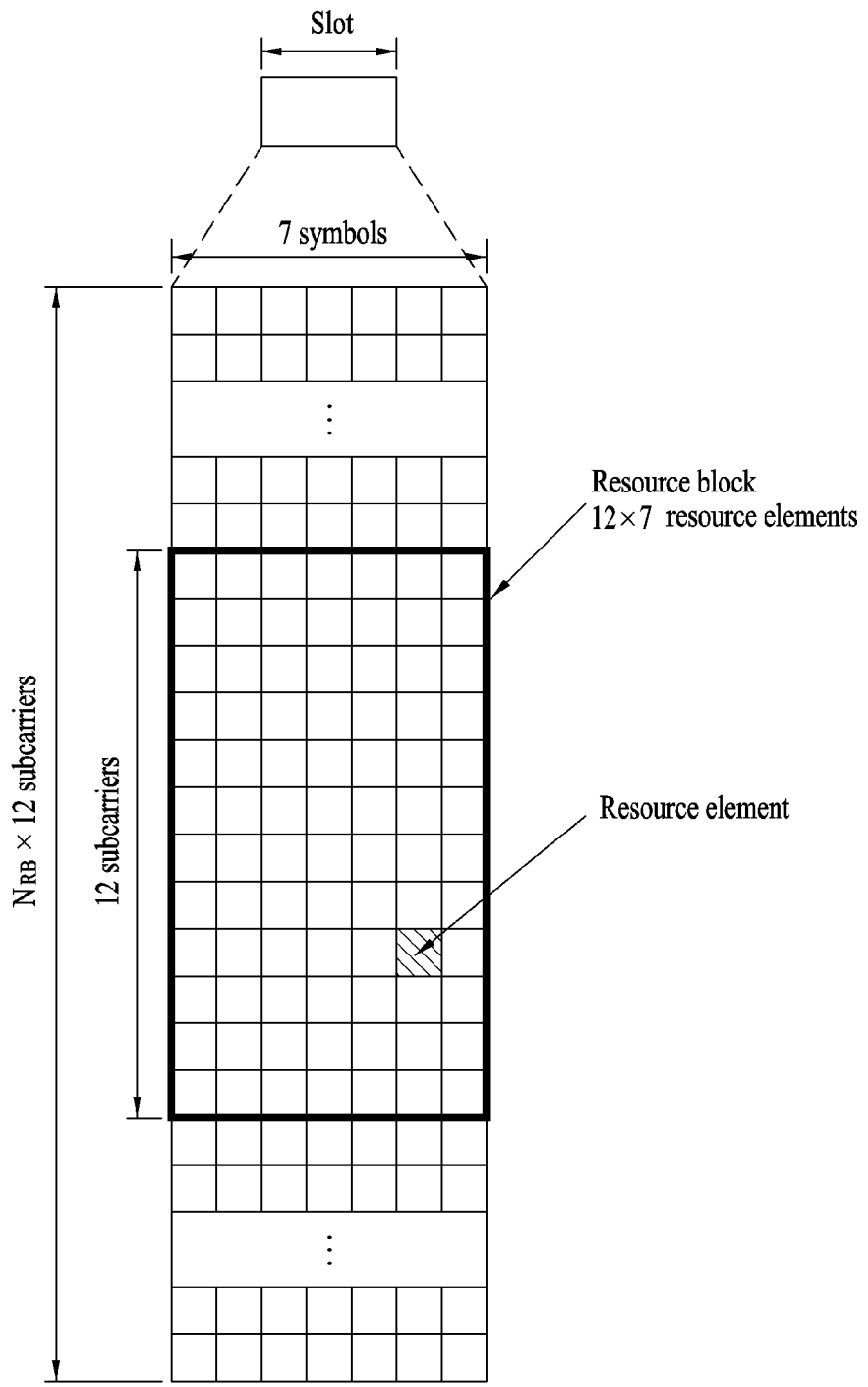
FIG. 2 illustrates a resource grid of a downlink slot.

FIG. 2 illustrates a resource grid of a DL slot.

Referring to FIG. 2, a DL slot includes a plurality of OFDMA (or OFDM) symbols in the time domain. One DL slot may include 7(6) OFDMA symbols according to cyclic prefix (CP) length, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of a UL slot may be same as that of the DL slot except that OFDMA symbols by replaced by SC-FDMA symbols.

Figure 3:
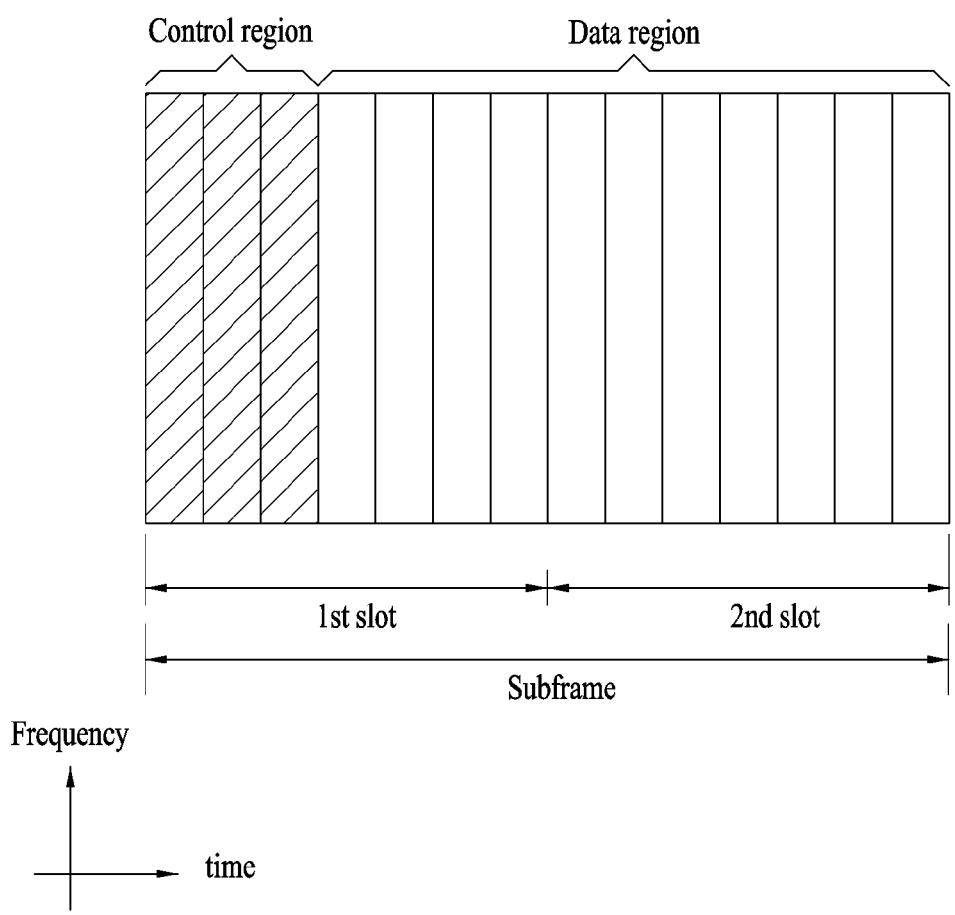
FIG. 3 illustrates a downlink subframe structure.

FIG. 3 illustrates a DL subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of DL control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ-ACK signal.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. Downlink control information (DCI) is transmitted through the PDCCH. DCI formats 0/4 (referred to as UL DCI formats hereinafter) for UL scheduling (or UL grant (UG)) and DCI formats 1/1A/1B/1C/1D/2/2A/2B/2C/2D (referred to as DL DCI formats) DL scheduling are defined. The DCI formats selectively include information such as hopping flag, RB allocation, MCS (Modulation Coding Scheme), RV (Redundancy Version), NDI (New Data Indicator), TPC (Transmit Power Control), DMRS (Demodulation Reference Signal) cyclic shift, etc. as necessary.

A plurality of PDCCHs can be transmitted within a control region. A UE monitors the plurality of PDCCHs per subframe in order to check a PDCCH destined therefor. The PDCCH is transmitted through one or more control channel elements (CCEs). A PDCCH coding rate may be controlled by the number of CCEs (i.e. CCE aggregation level) used for PDCCH transmission. A CCE includes a plurality of resource element groups (REGs). A format of the PDCCH and the number of PDCCH bits are determined by the number of CCEs. A BS determines a PDCCH format according to DCI to be transmitted to the UE, and attaches a cyclic redundancy check (CRC) to control information. The CRC is masked with an identifier (e.g. a radio network temporary identifier (RNTI)) according to an owner or usage of the PDCCH. If the PDCCH is for a specific UE, then an identifier (e.g., cell-RNTI (C-RNTI)) of the UE may be masked to the CRC. If the PDCCH is for a paging message, then a paging identifier (e.g., paging-RNTI (P-RNTI)) may be masked to the CRC. If the PDCCH is for system information (more specifically, a system information block (SIB)), then a system information RNTI (SI-RNTI) may be masked to the CRC. When the PDCCH is for a random access response, then a random access-RNTI (RA-RNTI) may be masked to the CRC.

A PDCCH carries a message known as DCI. In general, a plurality of PDCCHs is transmitted in a subframe. Each PDCCH is transmitted using one or more CCEs. Here, one CCE corresponds to 9 REGs and one REG corresponds to 4 REs. Four QPSK symbols are mapped to each REG. The REs occupied by a reference signal do not belong to the REG, and thus the number of REGs within a given OFDM symbol varies according to whether a cell-specific reference signal is present. The concept of REG can be applied to other downlink control channels (i.e., PCFICH and PHICH). Four PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The CCEs are sequentially numbered and consecutively used. To simplify a decoding process, a PDCCH having a format composed of n CCEs may start only at a CCE having a number corresponding to a multiple of n. The number of CCEs used to transmit a specific PDCCH is determined by a BS according to a channel state. For instance, in case of a PDCCH for a UE having a good DL channel (e.g., a UE adjacent to a BS), one CCE may be sufficient. However, in case of a PDCCH for a UE having a poor channel (e.g., a UE located at a cell boundary), 8 CCEs may be used to obtain sufficient robustness. In addition, a power level of the PDCCH may be adjusted based on the channel state.

In the LTE system, a CCE set in which a PDCCH can be located is defined for each UE. A CCE set in which the UE can detect its PDCCH is referred to as a PDCCH search space or simply as a search space (SS). An individual resource on which a PDCCH can be transmitted in the SS is referred to as a PDCCH candidate. One PDCCH candidate may correspond to 1, 2, 4, or 8 CCEs depending on the CCE aggregation level. The BS transmits an actual PDCCH (DCI) on a random PDCCH candidate in the SS and the UE monitors the SS to detect the PDCCH (DCI). Particularly, the UE attempts to perform blind decoding (BD) on PDCCH candidates in the SS.

In the LTE system, SSs for respective PDCCH formats may have different sizes. Specifically, a dedicated SS (or, UE-specific SS (USS)) and a common SS (CSS) are defined. The USS is configured for each individual UE, and information on a range of the CSS is provided to all UEs. At a given UE, the USS and CSS may overlap each other.

Since the SSs have relatively small sizes and they may overlap each other, the BS may be unable to find a CCE resource for transmitting the PDCCH to all of the preferred UEs in a given subframe. This is because, if the CCE resource is allocated for another UE, there may be no CCE resource for a specific UE in an SS of the corresponding UE (blocking). To minimize the possibility that the blocking is maintained until a next subframe, a UE-specific hopping sequence is applied to a starting point of the dedicated SS. Table 3 shows sizes of the USS and CSS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

Figure 4:
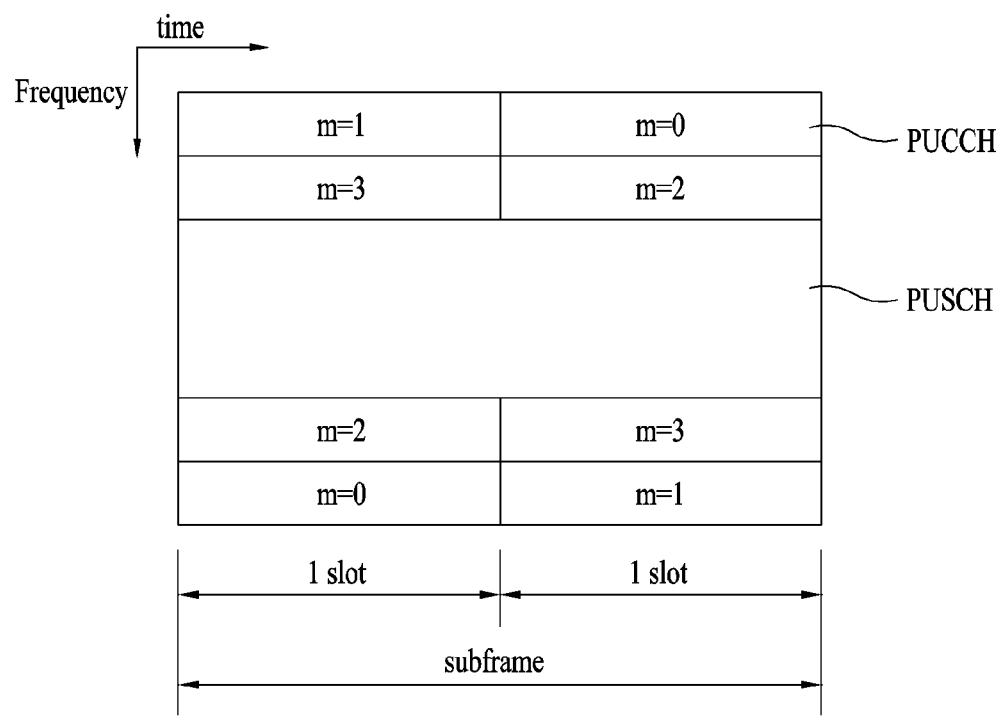
FIG. 4 illustrates the structure of an uplink subframe.

FIG. 4 illustrates a UL subframe structure.

Referring to FIG. 4, a UL subframe includes a plurality of (e.g. 2) slots. A slot may include different numbers of SC-FDMA symbols according to CP lengths. The UL subframe is divided into a control region and a data region in the frequency domain. The data region is used to carry a data signal such as audio data through a physical uplink shared channel (PUSCH). The control region is used to carry uplink control information (UCI) through a physical uplink control channel (PUCCH). The PUCCH includes an RB pair located at both ends of the data region in the frequency domain and hopped in a slot boundary.

The PUCCH can be used to transmit the following control information.

- SR (scheduling request): This is information used to request a UL-SCH resource and is transmitted using On-Off Keying (OOK) scheme.
- HARQ-ACK: This is an acknowledgement signal for a DL signal (e.g. a PDSCH or SPS release PDCCH). For example, a 1-bit ACK/NACK signal is transmitted as a response to a single DL codeword and a 2-bit ACK/NACK signal is transmitted as a response to two DL codewords.
- CSI (channel state information): This is feedback information about a DL channel. The CSI includes a CQI (channel quality indicator), RI (rank indicator), PMI (precoding matrix indicator), PTI (precoding type indicator), etc.

Table 4 shows the mapping relationship between PUCCH formats and UCI in LTE(-A).

TABLE 4

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CSI (20 coded bits) |
| Format 2 | CSI and 1- or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Figure 5:
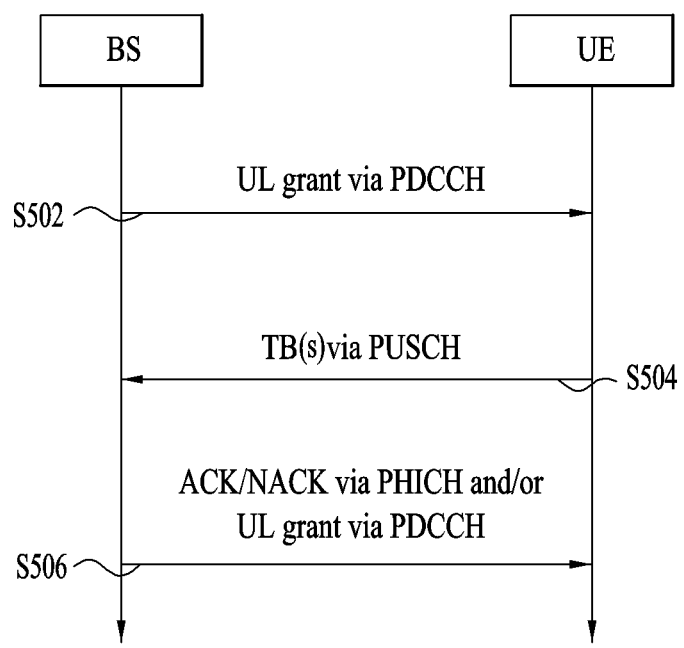
FIG. 5 illustrates a method of transmitting an ACK/NACK signal for uplink data.
Figure 6:
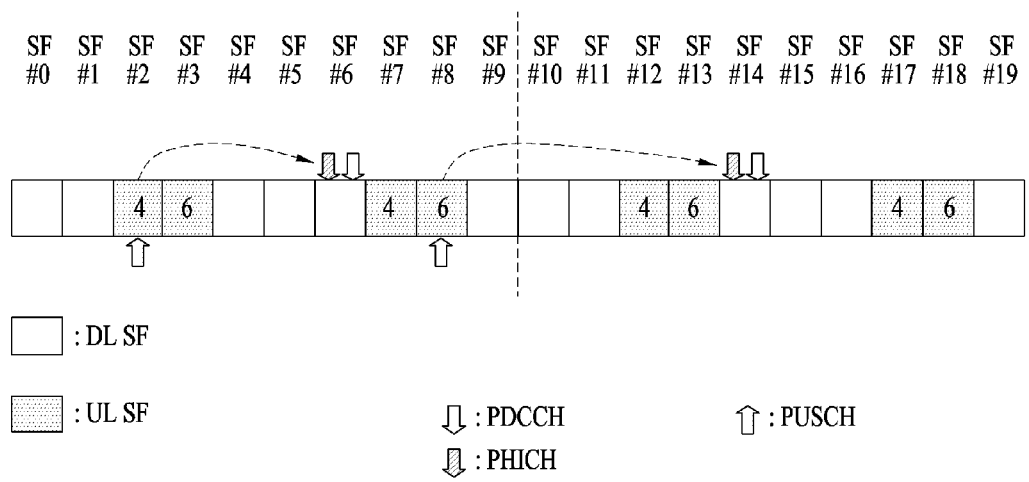
FIG. 6 illustrates a PUSCH-UL grant/PHICH timing.

FIG. 5 illustrates a method of transmitting an ACK/NACK signal (e.g., PHICH) for uplink data and FIG. 6 illustrates a PUSCH-UG/PHICH timing. A PHICH is used to transmit DL ACK/NACK. Here, the DL ACK/NACK means ACK/NACK transmitted in downlink as a response to UL data (e.g. PUSCH).

Referring to FIG. 5, a UE receives a PDCCH signal with a UG (uplink grant) (hereinafter referred to as a UG PDCCH) from a BS [S502]. The UG contains scheduling information for PUSCH transmission. Subsequently, the UE transmits a PUSCH signal to the BS [S504]. The PUSCH signal is used to transmit one or a plurality of (e.g. 2) transport blocks (TBs) according to transmission mode. After performing processes for A/N transmission (e.g., A/N generation, A/N resource allocation, etc.), the BS may transmit A/N to the UE through a PHICH after a $k_{PHICH}$ subframe (hereinafter referred to as a PHICH timing) as a response to the PUSCH transmission [S506]. The A/N includes acknowledgement information for the PUSCH signal of the step S504. Moreover, when the response to the PUSCH transmission is NACK, the BS may transmit a UG PDCCH for PUSCH retransmission to the UE after the $k_{PHICH}$ subframe [S506].

Table 5 shows a PHICH timing defined in the TDD. For PUSCH transmission in subframe #n, a UE determines a corresponding PHICH resource in subframe #(n+$k_{PHICH}$).

TABLE 5

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

FIG. 6 illustrates UG/PHICH transmission timing when UL-DL configuration #1 is configured. In the figure, SF#0 to #9 and SF#10 to #19 respectively correspond to radio frames, and numerals in blocks denote DL subframes relating to UL subframes. For example, a UG/PHICH corresponding to a PUSCH of SF#2 is transmitted in SF#2+4 (=SF#6) and a UG/PHICH corresponding to a PUSCH of SF#8 is transmitted in SF#8+6 (=SF#14).

Figure 7:
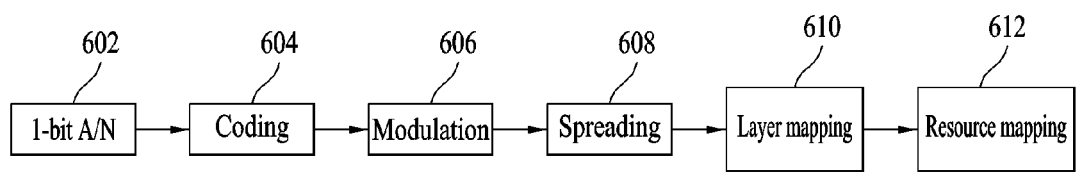
FIG. 7 illustrates a PHICH signal processing process/block.

FIG. 7 illustrates a PHICH signal processing process/block.

Referring to FIG. 7, an A/N generation block 602 generates one piece of 1-bit A/N as a response to a PUSCH in case of MU-MIMO (multi-user multiple input multiple output) and generates two pieces of 1-bit A/N as a response to a PUSCH in case of SU-MIMO (single-user MIMO). Subsequently, (channel) coding 604 (e.g., ⅓ repetition coding), modulation 606 (e.g., BPSK (binary phase shift keying)), spreading 608, layer mapping 610, and resource mapping 612 are applied to the A/N bit for PHICH generation.

A plurality of PHICHs may be mapped to the same RE (e.g. REG) and then form a PHICH group. The REG is composed of four neighboring REs among the remaining REs except REs for a reference signal on one OFDM symbol. Each PHICH is identified by an orthogonal sequence (used in spreading) in the PHICH group. Accordingly, a PHICH resource is identified by an index pair ($n_{PHICH}^{group}$, $n_{PHICH}^{seq}$). Here, $n_{PHICH}^{group}$ represents a PHICH group number and $n_{PHICH}^{seq}$ represents an orthogonal sequence index. $n_{PHICH}^{group}$ and $n_{PHICH}^{seq}$ are checked using the lowest physical RB (PRB) index from among PRB indices allocated for PUSCH transmission and a cyclic shift of a DMRS transmitted through a UG.

Equation 1 represents an example of calculating $n_{PHICH}^{group}$ and $n_{PHICH}^{seq}$.

$$n_{PHICH}^{group} = (I_{PRB\_RA} + n_{DMRS}) \bmod N_{PHICH}^{group} + I_{PHICH} N_{PHICH}^{group}$$

$$N_{PHICH}^{seq} = (\lfloor I_{PRB\_RA} / N_{PHICH}^{group} \rfloor + n_{DMRS}) \bmod 2N_{SF}^{PHICH}$$

[Equation 1]

In Equation 1, $n_{DMRS}$ is mapped from a DMRS field value (i.e. cyclic shift) in a UG PDCCH signal which is most recently received in response to PUSCH transmission. $N_{SF}^{PHICH}$ represents the size of a spreading factor used for PHICH modulation. $N_{SF}^{PHICH}$ is 4 in case of normal CP and 2 in case of extended CP. $N_{PHICH}^{group}$ represents the number of PHICH groups. In the case of the first TB of the PUSCH, $I_{PRB\_RA}$ is $I_{PRB\_RA}^{lowest\_index}$. In the case of the second TB of the PUSCH, $I_{PRB\_RA}$ is $I_{PRB\_RA}^{lowest\_index}+1$. $I_{PRB\_RA}^{lowest\_index}$ denotes the lowest PRB index (of the first slot) in PUSCH transmission. For PUSCH transmission in a subframe n (where, n=4 or 9) in TDD UL-DL configuration #0, $I_{PHICH}$ is set to 1. In other case, it is set to 0.

In the case of FDD (frame structure type 1), the number of PHICH groups, $N_{PHICH}^{group}$, is identical in all subframes. In addition, $N_{PHICH}^{group}$ in each subframe is given by Equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 2]}$$

In Equation 2, $N_g \in \{1/6, 1/2, 1, 2\}$, is provided by a higher layer and $N_{RB}^{DL}$ represents the number of RBs of a DL band.

In the case of TDD (frame structure type 2), the number of PHICH groups may be changed in each DL subframe and is given by $m_i \cdot N_{PHICH}^{group}$. Table 6 shows $m_i$. For convenience, a PHICH resource (or the amount of PHICH resources) in case of $m_i=1$ is referred to as 1×PHICH resource and a PHICH resource (or the amount of PHICH resources) in case of $m_i=2$ is referred to as 2×PHICH resource.

TABLE 6

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Table 7 shows orthogonal sequences used in A/N bit spreading.

TABLE 7

| | Orthogonal sequence | |
|---|---|---|
| Sequence index $n_{PHICH}^{seq}$ | Normal cyclic prefix $N_{SF}^{PHICH}=4$ | Extended cyclic prefix $N_{SF}^{PHICH}=2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 8:
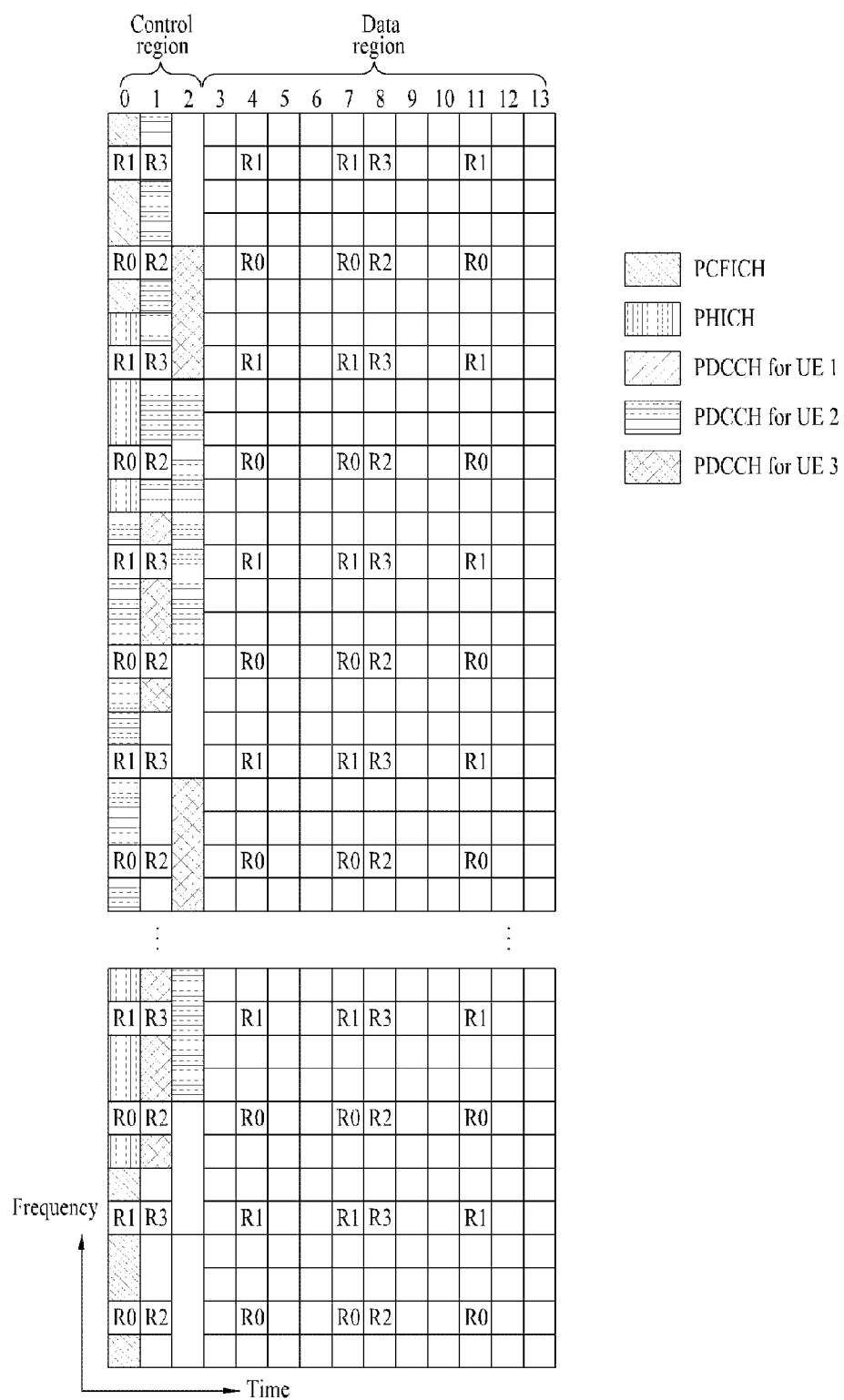
FIG. 8 illustrates structures of a downlink frame and physical channels.

FIG. 8 illustrates a structure of a downlink physical channel. In the drawing, R1 to R4 indicates CRSs (cell-specific reference signals) for antennas 0 to 3. Referring to FIG. 8, a control region includes a PCFICH, PHICH, and PDCCH. The basic resource of the downlink physical channel is an REG (resource element group). The REG is composed of four neighboring REs except an RS in an OFDMA symbol. The downlink physical channel is mapped to in an order of PCFICH>PHICH>PDCCH. That is, the PHICH is mapped to the rest of the REG except the PCFICH, and then the PDCCH is mapped to the remaining REG except the PCFICH/PHICH. Since PDCCH resources are changed according to PHICH resource, a UE should be aware of PHICH resource allocation information for PHCCH detection.

Figure 9:
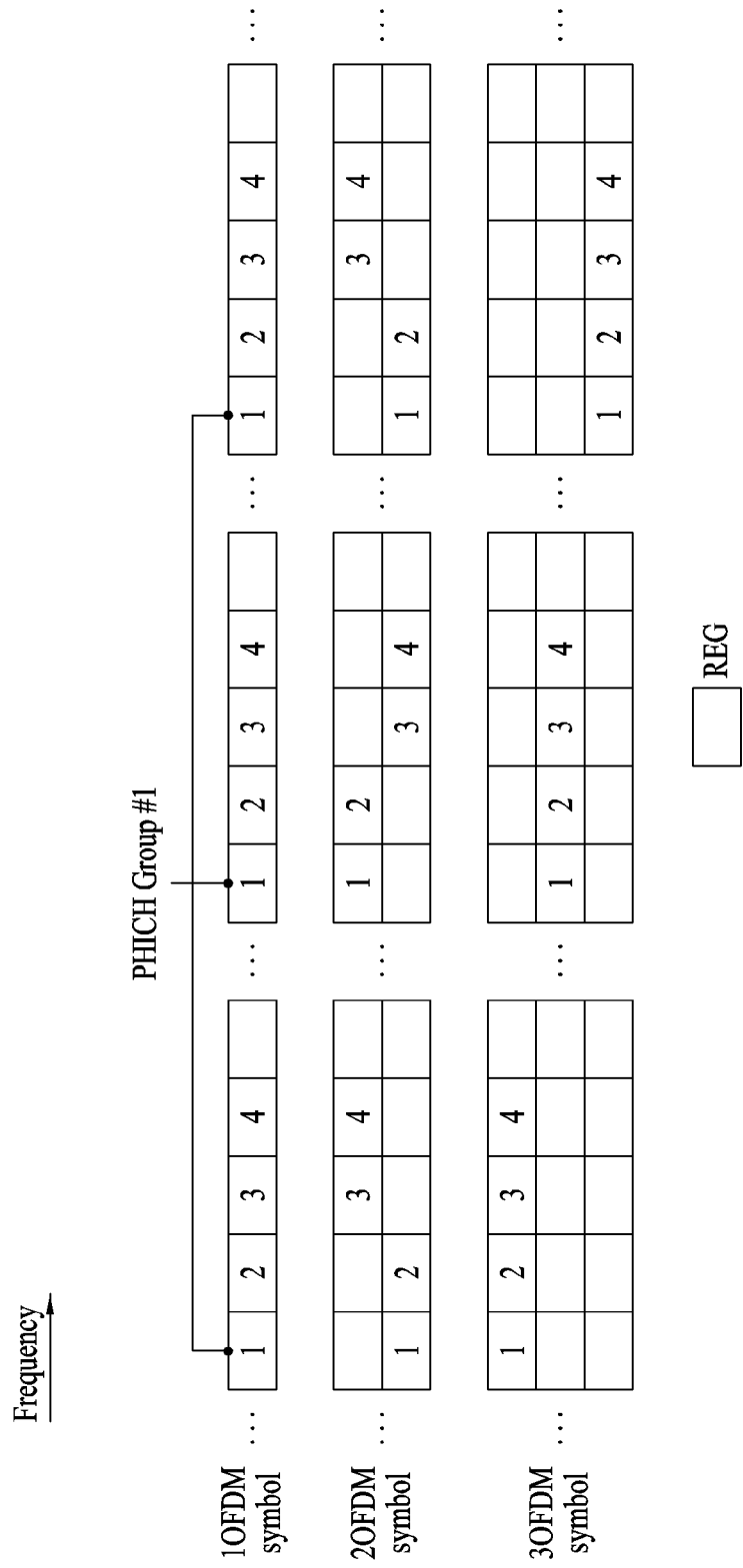
FIG. 9 illustrates an example of assigning a PHICH group.

FIG. 9 illustrates an example of a PHICH group. Referring to FIG. 9, a PHICH group is transmitted using 3 REGs spaced as far apart as possible in the frequency domain. Consequently, each bit of an A/N codeword is transmitted through each REG. PHICH groups are consecutively allocated in the frequency domain. In the drawing, the same numeral denotes REGs belonging to the same PHICH group. A PHICH interval is limited by the size of the control region, and the number of OFDM symbols (PHICH interval) used for PHICH transmission corresponds to one to three OFDMA symbols. When a plurality of OFDMA symbols is used for the PHICH transmission, REGs belonging to the same PHICH group are transmitted using different OFDMA symbols.

Figure 10:
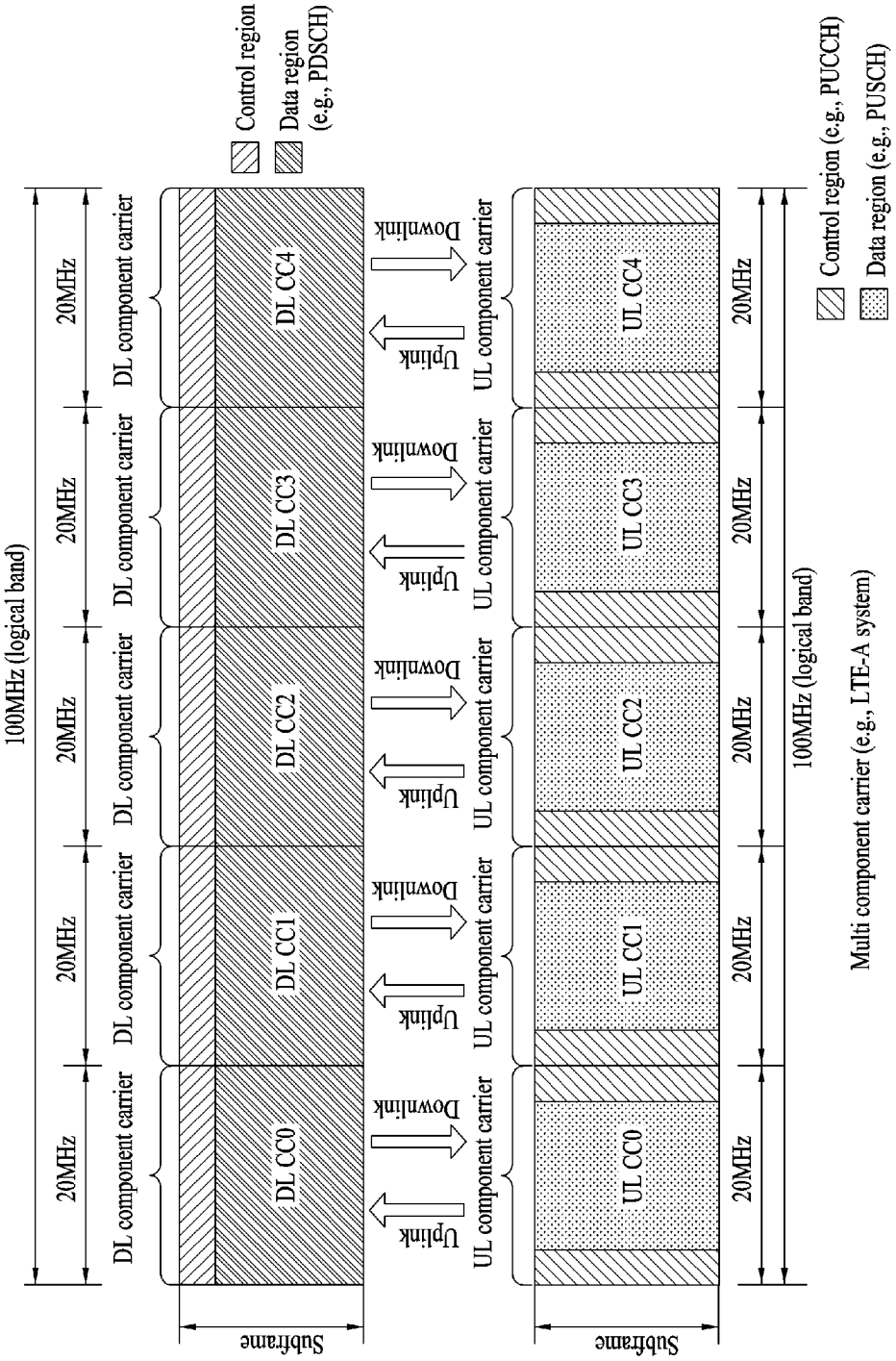
FIG. 10 illustrates a carrier aggregation (CA)-based wireless communication system.

FIG. 10 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 10, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be configured cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of DL resources and UL resources. Yet, the UL resources are not mandatory. Therefore, a cell may be composed of DL resources only or both DL resources and UL resources. The linkage between the carrier frequencies (or DL CCs) of DL resources and the carrier frequencies (or UL CCs) of UL resources may be indicated by system information when CA is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and one or more SCells, for a UE in an RRC_CONNECTED state, for which CA is set.

Unless otherwise specified, the invention (mentioned with reference to FIGS. 1 to 10) can be applied to an individual CC (or cell) when a plurality of CCs (or cells) are aggregated. In the present specification, the term "CC" can be interchangeably used with terms such as "serving CC", "serving carrier", "cell", and "serving cell".

When a plurality of CCs is configured, cross-CC scheduling and non-cross-CC scheduling may be used. Non-cross-CC scheduling corresponds to scheduling in LTE. When cross-CC scheduling is applied, a DL grant PDCCH may be transmitted on DL CC#0 and a PDSCH corresponding thereto may be transmitted on DL CC#2. Similarly, a UL grant PDCCH may be transmitted on DL CC#0 and a PUSCH corresponding thereto may be transmitted on DL CC#4. For cross-CC scheduling, a carrier indicator field (CIF) is used. Presence or absence of a CIF in a PDCCH may be semi-statically and UE-specifically (or UE-group-specifically) configured through higher layer signaling (e.g. RRC signaling).

Scheduling according to the CIF may be arranged as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS may allocate a monitoring DL CC to reduce blind detection complexity of the UE. For PDSCH/PUSCH scheduling, the UE may detect/decode a PDCCH only on the corresponding DL CCs. In addition, the BS may transmit a PDCCH only through the monitoring DL CC (set). The monitoring DL CC set may be UE-specifically, UE-group-specifically or cell-specifically configured.

Figure 11:
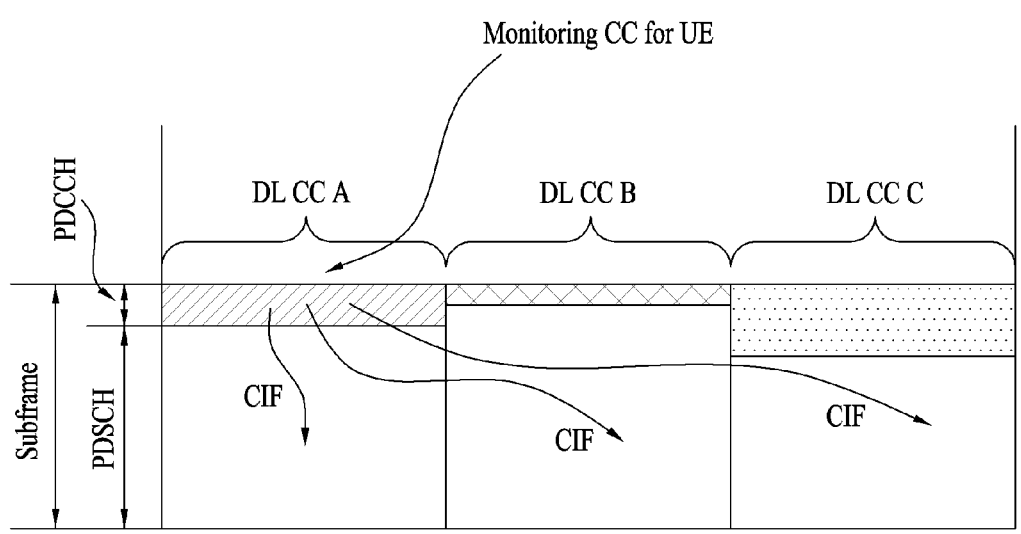
FIG. 11 illustrates a scheduling method when a plurality of cells is configured.

FIG. 11 illustrates cross-carrier scheduling. While the figure shows DL scheduling, cross-carrier scheduling is equally applied to UL scheduling.

Referring to FIG. 11, 3 DL CCs are configured for a UE, and DL CC A may be set as a PDCCH monitoring DL CC. When the CIF is disabled, each DL CC can transmit only a PDCCH that schedules a PDSCH corresponding to the DL CC without a CIF according to LTE PDCCH rule. When the CIF is enabled, DL CC A (i.e. MCC) can transmit not only a PDCCH that schedules the PDSCH corresponding to the DL CC A but also PDCCHs that schedule PDSCHs of other DL CCs using the CIF. In this case, a PDCCH is not transmitted in DL CC B/C.

Here, a specific CC (or cell) used to transmit scheduling information (e.g. PDCCH) is referred to as "monitoring CC (MCC)" which may be replaced by "monitoring carrier", "monitoring cell", "scheduling carrier", "scheduling cell", "scheduling CC", etc. A DL CC on which a PDSCH corresponding to a PDCCH is transmitted and a UL CC on which a PUSCH corresponding to a PUCCH is transmitted may be referred to as a scheduled carrier, a scheduled CC, a scheduled cell, etc. One or more scheduling CCs may be configured per UE. A scheduling CC may include a PCC. When only one scheduling CC is configured, the scheduling CC may be the PCC. The scheduling CC may be UE-specifically, UE-group-specifically or cell-specifically set.

In case of cross-CC scheduling, signal transmission may be performed as follows.

PDCCH (UL/DL grant): scheduling CC (or MCC)

PDSCH/PUSCH: CC indicated by a CIF of a PDCCH detected from a scheduling CC

DL ACK/NACK (e.g. PHICH): scheduling CC (or MCC) (e.g. DL PCC)

UL ACK/NACK (e.g. PUCCH): UL PCC

In the following description, DL ACK/NACK may be referred to as DL A/N or PHICH and UL ACK/NACK may be referred to as UL A/N or A/N for convenience.

Meanwhile, not only aggregation of a plurality of CCs with the same SF configuration but also aggregation of a plurality of CCs with different SF configurations can be implemented. For instance, the aggregation of a plurality of CCs with different SF configurations includes aggregation of a plurality of CCs configured with different UL-DL configurations (for convenience, referred to as different TDD CA) and aggregation of TDD CCs and FDD CCs.

Moreover, even in the case of the aggregation of a plurality of CCs with different SF configurations, cross-CC scheduling can be supported. In this case, a UL grant/PHICH timing configured in an MCC may be different from that configured in an SCC (See FIGS. 5 and 6). To transmit a UG/PHICH for UL data transmitted through an SCC UL SF, which is cross-CC-scheduled with an MCC UL SF and the MCC, the same UG/PHICH timing or different UG/PHICH timings (configured in a specific UL-DL configuration) may be applied per CC. Alternatively, the UG/PHICH timings configured in the specific UL-DL configuration may be commonly applied to all CCs (i.e. PCC (or MCC) and SCC). In addition, the specific UL-DL configuration (hereinafter referred to as a reference configuration (Ref-Cfg)) may be identical to a UL-DL configuration configured in the PCC (or MCC) (i.e., MCC-Cfg) or a UL-DL configuration configured in the SCC (i.e., SCC-Cfg). Alternatively, the reference configuration may be determined as a UL-DL configuration other than MCC-Cfg and SCC-Cfg. Here, a UG or PHICH timing may mean 'D' capable of transmitting/receiving a UG for scheduling UL data of a specific 'U' and a PHICH for transmitting the corresponding UL data. Alternatively, the UG or PHICH timing may mean a timing relationship therebetween. Specifically, the application of a UL grant or PHICH timing configured in a specific CC (i.e., Ref-CC) or a specific UD-Cfg (i.e., Ref-Cfg) may mean the use of a parameter value corresponding to a UD-Cfg of the specific CC or the specific UD-Cfg shown in Table 5.

Embodiment: Control Information Allocation/Transmission in Dynamic Subframe Reconfiguration In a system beyond the LTE, an operating scheme that reconfigures/changes a UL/DL SF direction has been considered for the purpose of eIMTA (enhanced interference mitigation and traffic adaptation) in the TDD. To this end, it is considered a scheme for (semi-)statically configuring a basic UL-DL configuration (i.e., UD-cfg) of a TDD cell (or CC) using higher layer signaling (e.g., SIB) and then dynamically reconfiguring/changing an operating UD-cfg of the corresponding cell (or CC) using lower layer (e.g., L1 (Layer1)) signaling (e.g., PDCCH). For convenience, the basic UD-cfg is referred to an SIB-cfg and the operating UD-cfg is referred to as an actual-cfg. The subframe configuration in accordance with the UD-cfg is determined based on Table 1. In addition, in the present invention, a DL SF, a UL SF and a special SF are referred to as D, U and S, respectively.

Regarding the above-mentioned dynamic reconfiguration, a reconfiguration from D to U (or S) (i.e., D=>U (or S)) may be difficult to be achieved or cause degradation in consideration of the legacy UE's DL reception/measurement, which is performed in the corresponding D using a CRS. On the other hand, in case of a reconfiguration from U (or S) to D (i.e., U (or S)=>D), a BS does not intentionally schedule/configure a UL signal, which may be transmitted by the legacy UE through the corresponding U, whereby additional DL resources can be provided to an eIMTA UE.

In consideration of this fact, the actual-cfg can be selectively determined only from UD-cfgs (including the SIB-cfg) including all Ds on the SIB-cfg. That is, although a UD-cfg having D arranged at every D position on the SIB-cfg can be determined as the actual-cfg, a UD-cfg having U arranged at a D position on the SIB-cfg cannot be determined as the actual-cfg. Meanwhile, in the eIMTA, a reference UD-cfg (hereinafter referred to as a D-ref-cfg) can be separately configured by a higher layer (signaling) in order to configure an HARQ timing (e.g., HARQ-ACK feedback transmission timing) for DL scheduling. Considering this, the actual-cfg can be selectively determined only from UD-cfgs (including the D-ref-cfg) that include all Us on the D-ref-cfg. Therefore, a UD-cfg in which D is arranged at a U position on the D-ref-cfg cannot be determined as the actual-cfg.

Accordingly, the D-ref-cfg can be set to the UD-cfg including all of the Ds on available actual-cfg candidates and the SIB-cfg can be set to the UD-cfg including all of the Us on the available actual-cfg candidates. In other words, the D-ref-cfg can be set to the UD-cfg obtained from a superset of Ds on the available actual-cfg candidates and the SIB-cfg can be set to the UD-cfg obtained from a superset of Us on the available actual-cfg candidates. A reference UD-cfg (hereinafter referred to as U-ref-cfg) of an HARQ timing (e.g., UG/PUSCH/PHICH transmission timing) for UL scheduling can be set to the SIB-cfg. Thus, U on the D-ref-cfg can be considered as fixed U and D on the SIB-cfg can be considered as fixed D. Hence, only the SF, which simultaneously corresponds to D on the D-ref-cfg and U on the SIB-cfg, can be considered as flexible U that can be reconfigured/changed as U=>D. The flexible U can also be reconfigured/changed as U=>D in the actual-cfg.

Consequently, after the SIB-cfg/D-ref-cfg is configured by the higher layer (signaling), one of the UD-cfg(s) containing all of the Ds on the SIB-cfg and all of the Us on the D-ref-cfg can be set to the actual-cfg by the L1 signaling.

Table 8 shows available actual-cfg candidates (UD-cfgs#3~#5) when the SIB-cfg and D-ref-cfg are respectively set to UD-cfg#3 and UD-cfg#5 (i.e., in the case of [SIB-cfg=UD-cfg#3, D-ref-cfg=UD-cfg#5]).

TABLE 8

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 (SIB-cfg) | D | S | U | U | U | D | D | D | D | D |
| 4 | D | S | U | U | D | D | D | D | D | D |
| 5 (D-ref-cfg) | D | S | U | D | D | D | D | D | D | D |
| 6 | D | S | U | U | U | D | S | U | U | D |

Figure 12:
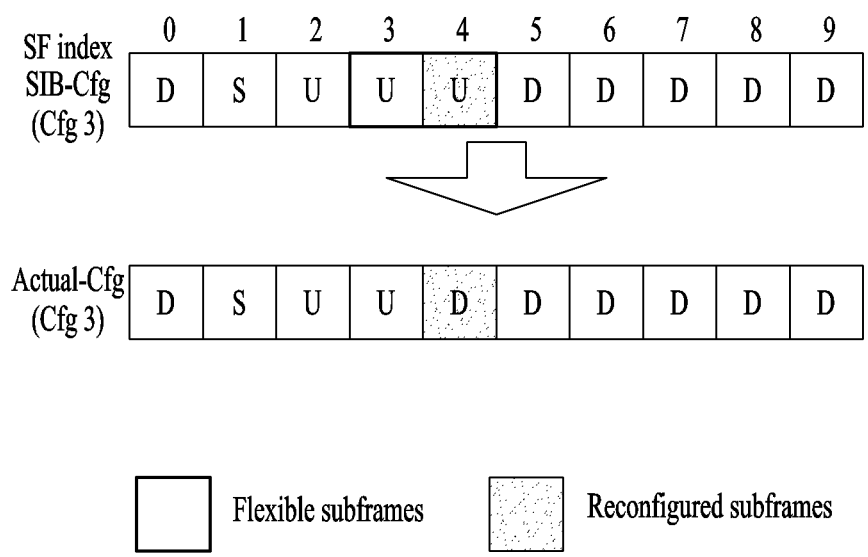
FIG. 12 illustrates a reconfiguration from U to D (U=>D) in an eIMTA cell.

Table 9 shows fixed U (SF#2 of SIB-cfg) and flexible U (SF#3/#4 of SIB-cfg) when the SIB-cfg and D-ref-cfg are respectively set to UD-cfg#3 and UD-cfg#5 (i.e., in the case of [SIB-cfg=UD-cfg#3, D-ref-cfg=UD-cfg#5]). Only SF#3 and SF#4 can be reconfigured from U to D (U=>D). FIG. 12 shows a case in which SF#4 is reconfigured as D using the actual-cfg (UD-cfg#4) of conditions in Table 9.

TABLE 9

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 3 (SIB-cfg) | D | S | U | U | U | D | D | D | D | D |
| 4 | D | S | U | U | D | D | D | D | D | D |
| 5 (D-ref-cfg) | D | S | U | D | D | D | D | D | D | D |

Table 10 shows every flexible U per SIB-cfg (SF#3/4/7/8/9 of UD-cfg#0, SF#3/7/8 of UD-cfg#1, SF#7 of UD-cfg#2, SF#3/4 of UD-cfg#3, SF#3 of UD-cfg#4, SF#3/4/7/8 of UD-cfg#6). Actual flexible U is given as a subset of hatching parts according to the D-ref-cfg.

TABLE 10

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In the conventional LTE system, in the case of a specific UD-cfg (e.g., a UD-cfg having a large number of Us), PHICH resources are reserved/configured in all Ds (or Ss) according to (the number of Us of) the UD-cfg. On the other hand, in the case of a different UD-cfg (e.g., a UD cfg having a small number of Us), PHICH resources are reserved/configured in partial specific Ds (or Ss) and are not allocated to the remaining Ds (or Ss). Meanwhile, when the eIMTA is applied, both of the eIMTA UE and the legacy UE perform a PHICH reception operation by applying a UL HARQ timing configured in the SIB-cfg, and PHICH resource for the operation are allocated to fixed Ds. Thus, it does not cause any problems. However, in case that flexible U is reconfigured as D, only if whether the PHICH resource is allocated to the corresponding SF is obviously defined, a UE can receive/detect other control channels (e.g., PDCCH). This is because, in the case of the PDCCH, the resources remaining after the PHICH resource allocation are used.

Hereinafter, proposed is a method of reserving/configuring a PHICH resource in flexible U when the corresponding SF is reconfigured as D in the state in which the eIMTA is applied. In the proposed method, the parameter/configuration corresponding to the SIB-cfg in Table 6 can be applied as it is for PHICH resource reservation/configuration in fixed D. Whether the eIMTA is applied may be configured differently in each cell. In addition, in the case of a non-eIMTA cell, the PHICH resource reservation/configuration can be determined according to the conventional scheme (See Table 6). In the present invention, a PDCCH may include both the conventional PDCCH and a new type of an EPDCCH (Enhanced PDCCH) (unless otherwise specified).

FIG. 13 illustrates a procedure for receiving control information (i.e., control channel) when the eIMTA is applied according to one embodiment of the present invention. The eIMTA can be applied per cell. Although FIG. 13 mainly illustrates the procedure related to UE operations for convenience, it is apparent that a BS can also perform operations corresponding to the procedure of FIG. 13. In addition, operation in an eIMTA cell is assumed in FIG. 13.

Referring to FIG. 13, a UE can configure an SIB-cfg of the eIMTA cell semi-statically [S1302]. Particularly, the UE may receive a higher layer signal (e.g., RRC message (e.g., SIB)) having UD-cfg indication information from a BS. In addition, although not shown in the drawing, the UE may also receive a higher layer signal (e.g., RRC message (e.g., SIB)) having D-ref-cfg indication information from the BS. Subsequently, the UE can dynamically configure an actual-cfg of the eIMTA cell [S1304]. The actual-cfg is given by one of actual-cfg candidates in accordance with [SIB-cfg, D-ref-cfg]. Particularly, the UE may receive a lower layer signal (e.g., L1 signal (e.g., PDCCH)) having the UD-cfg indication information from the BS.

Thereafter, the UE can receive a DL signal from the BS or transmit a UL signal to the BS according to an SF configuration of the actual-cfg. For convenience, assuming that a DL SF in the actual-cfg is a subframe i, the UE can receive the DL signal in the subframe i [S1306] and then detect a DL control channel (e.g., PHICH, PDCCH, etc.) based on the amount of PHICH resources (e.g., the number of PHICH groups) in the subframe i [S1308]. If the subframe i corresponds to fixed D, PHICH resources may be allocated according to the SIB-cfg. If the subframe i corresponds to flexible U, PHICH resources may be determined by Alt 1-1 to Alt 1-5.

Alt 1-1) No PHICH Resource in any Flexible UL SF

PHICH resources may not be allocated to any flexible Us. Thus, a value of parameter mi for determining the amount of PHICH resources (e.g., the number of PHICH groups) per SF may be set to 0 in every flexible U. According to the Alt 1-1, it is possible to secure more resources which can be used in other control channels such as PDCCH and the like by reducing unnecessarily reserved PHICH resources.

If a PHICH resource in each SF is generalized to be allocated according to the SIB-cfg in the TDD, Table 6 may be changed as follows.

TABLE 11

| Uplink-downlink configuration = SIB cfg | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | 0 | 0 | 2 | 1 | 0 | 0 | 0 |
| 1 | 0 | 1 | — | 0 | 1 | 0 | 1 | 0 | 0 | 1 |
| 2 | 0 | 0 | — | 1 | 0 | 0 | 0 | 0 | 1 | 0 |
| 3 | 1 | 0 | — | 0 | 0 | 0 | 0 | 0 | 1 | 1 |
| 4 | 0 | 0 | — | 0 | 0 | 0 | 0 | 0 | 1 | 1 |
| 5 | 0 | 0 | — | 0 | 0 | 0 | 0 | 0 | 1 | 0 |
| 6 | 1 | 1 | — | 0 | 0 | 1 | 1 | 0 | 0 | 1 |

Alt 1-2) Reserve PHICH Resource Over all Flexible UL SFs

PHICH resources may be allocated to all flexible Us. Thus, a value of parameter mi for determining the amount of PHICH resources per SF may be set to 1 in every flexible U. The Alt 1-2 may be efficiently used when a plurality of cells are aggregated based on the CA in a single UE and UL/DL SF configurations between the cells are different from each other. This is because in the case of flexible U, PHICH reception corresponding to a specific cell may be required. For instance, if a PCell is an eIMTA cell (PCell=eIMTA cell), a U-ref-cfg of an Scell may be equal to an actual-cfg of the PCell. In this case, from the viewpoint of a UE, a signal transmission process is performed in an order of UG reception on PCell=>PUSCH transmission on SCell=>PHICH reception on PCell. Moreover, PHICH transmission on reconfigured D (i.e., flexible U) of PCell may be required.

If a PHICH resource in each SF is generalized to be allocated according to the SIB-cfg in the TDD, Table 6 may be changed as follows. The mi of the flexible U is valid only when the corresponding flexible U is reconfigured as D.

TABLE 12

| Uplink-downlink configuration = SIB cfg | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | 1 | 1 | 2 | 1 | 1 | 1 | 1 |
| 1 | 0 | 1 | — | 1 | 1 | 0 | 1 | 1 | 1 | 1 |
| 2 | 0 | 0 | — | 1 | 0 | 0 | 0 | 1 | 1 | 0 |
| 3 | 1 | 0 | — | 1 | 1 | 0 | 0 | 0 | 1 | 1 |
| 4 | 0 | 0 | — | 1 | 0 | 0 | 0 | 0 | 1 | 1 |
| 5 | 0 | 0 | — | 0 | 0 | 0 | 0 | 0 | 1 | 0 |
| 6 | 1 | 1 | — | 1 | 1 | 1 | 1 | 1 | 1 | 1 |

Alt 1-3) Reserve PHICH Resource by Maximum Among UD-Cfg

The available maximum PHICH resources may be allocated to an SF number corresponding to flexible U (for all UD-cfgs). Thus, a value of mi for determining the amount of PHICH resources in the SF i corresponding to the flexible U may be set to the maximum value (e.g., 1 or 0) of mi for all UD-cfgs. The Alt 1-3 may also be efficiently used when a plurality of cells are aggregated based on the CA in a single UE and UL/DL SF configurations between the cells are different from each other. This is because in the case of the flexible U, PHICH reception corresponding to a specific cell may be required.

If a PHICH resource in each SF is generalized to be allocated according to the SIB-cfg in the TDD, Table 6 may be changed as follows. The mi of the flexible U is valid only when the corresponding flexible U is reconfigured as D.

TABLE 13

| Uplink-downlink configuration = SIB cfg | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | 1 | 1 | 2 | 1 | 0 | 1 | 1 |
| 1 | 0 | 1 | — | 1 | 1 | 0 | 1 | 0 | 1 | 1 |
| 2 | 0 | 0 | — | 1 | 0 | 0 | 0 | 0 | 1 | 0 |
| 3 | 1 | 0 | — | 1 | 1 | 0 | 0 | 0 | 1 | 1 |
| 4 | 0 | 0 | — | 1 | 0 | 0 | 0 | 0 | 1 | 1 |
| 5 | 0 | 0 | — | 0 | 0 | 0 | 0 | 0 | 1 | 0 |
| 6 | 1 | 1 | — | 1 | 1 | 1 | 1 | 0 | 1 | 1 |

Alt 1-4) Configure PHICH Reservation (or not) for Flexible UL SF

Whether a PHICH resource is allocated to flexible U or how many PHICH resources are allocated (e.g., mi value) may be determined by a BS. Specifically, the BS may 1) uniformly determine the allocation/amount of the PHICH resources for all flexible Us or 2) differently determine the allocation/amount of the PHICH resources in each flexible U. According to the Alt 1-4, resources for control channels can be flexibly managed from the perspective of the BS.

Alt 1-5) Reserve PHICH Resource According to Actual-Cfg

A PHICH resource may be allocated per SF based on an actual-cfg. Thus, a value of mi for determining the amount of PHICH resources in the SF i corresponding to flexible U may be set to equal to that in the case of the actual-cfg (e.g., 1 or 0). The Alt 1-5 may also be efficiently used when a plurality of cells are aggregated based on the CA in a single UE and UL/DL SF configurations between the cells are different from each other. This is because in the case of the flexible U, PHICH reception corresponding to a specific cell may be required.

If the PHICH resource in each SF is generalized to be allocated according to the SIB-cfg in the TDD, Table 6 may be changed as follows. The mi of the flexible U is set to 0 or 1 according to the actual-cfg and valid only when the corresponding flexible U is reconfigured as D.

TABLE 14

| Uplink-downlink configuration = | Subframe number i | | | | | | | | | |
|---|---|---|---|---|---|---|---|---|---|---|
| SIB cfg | 0 | 1 | 2 | 3 | 4 | 5 | 6 | 7 | 8 | 9 |
| 0 | 2 | 1 | — | 0 or 1 | 0 or 1 | 2 | 1 | 0 | 1 | 0 or 1 |
| 1 | 0 | 1 | — | 0 or 1 | 1 | 0 | 1 | 0 | 1 | 1 |
| 2 | 0 | 0 | — | 1 | 0 | 0 | 0 | 0 | 1 | 0 |
| 3 | 1 | 0 | — | 0 | 0 | 0 | 0 | 0 | 1 | 1 |
| 4 | 0 | 0 | — | 0 | 0 | 0 | 0 | 0 | 1 | 1 |
| 5 | 0 | 0 | — | 0 | 0 | 0 | 0 | 0 | 1 | 0 |
| 6 | 1 | 1 | — | 0 or 1 | 0 or 1 | 1 | 1 | 0 | 1 | 1 |

Additionally, separate PHICH-Config parameters (e.g., phich-Duration (normal or extended), phich-resource (⅙, ½, 1, 2), etc.) for PHICH (and other control channels including a PDCCH) resource allocation/mapping may be independently configured for the flexible U.

FIG. 14 illustrates a method for configuring/transmitting a PDCCH search space according to one embodiment of the present invention. When flexible U is reconfigured as D, a PDCCH search space in the corresponding SF may be configured according to Alts 2-1 to 2-3.

Alt 2-1) No CSS in any Flexible UL SF

In every flexible U, only a USS may be configured/transmitted and a CSS may not be configured/transmitted. That is, a BS may not configure a PDCCH candidate corresponding to the CSS. Also, a UE may not attempt to detect the PDCCH candidate corresponding to the CSS. According to the Alt 2-1, overlap between the CSS and USS does not occur, and thus more opportunities for use of additional functions, which can be configured only in the USS (DCI format), can be guaranteed. Moreover, it is also possible to omit a blind decoding operation required to detect the PDCCH candidate corresponding to the CSS. Examples of the additional functions that can be configured only in the USS include aperiodic SRS signal transmission triggering, aperiodic CSI report triggering for various cell combinations using a plurality of bits, etc.

Alt 2-2) Configurable CSS for Flexible UL SF

A BS may determine presence of CSS configuration/transmission in flexible U or configure a corresponding PDCCH candidate. Specifically, the BS may 1) uniformly determine the presence/information of the CSS configuration for all flexible Us or 2) differently determine the presence/information of the CSS configuration in each flexible U. According to the Alt 2-2, resources for control channels can be managed more flexibly from the perspective of the BS. That is, the Alt 2-2 can be adopted when additional opportunities for transmitting common system/control information need to be secured. For instance, (when U is changed as D (i.e., U=>D)) the CSS may be configured/transmitted for only the flexible U, which will be set to an MBSFN subframe. Otherwise, the CSS may not be configured/transmitted.

Alt 2-3) CSS in any Flexible UL SF

Similar to the conventional normal DL SF, both a CSS and USS may be configured in flexible U. However, in the case of overlap between the CSS and USS, priority of the USS can always be set higher irrespective of presence of cross-CC scheduling. The reason for this is that since a BS is expected not to perform an RRC reconfiguration using flexible U, more opportunities for use of additional functions, which can be configured only in the USS (DCI format), can be secured. The method of handling SS overlap in the Alt 2-3 can also be applied to the Alt 2-2.

Although the proposed methods (Alt 1-1 to Alt 2-3) are described focusing on the TDD-based eIMTA, the methods can be applied to an FDD-based eIMTA in a similar manner. In the FDD-based eIMTA, all or part of UL SFS on UL carriers can be reconfigured as DL SFs (and/or special SFs).

Figure 15:
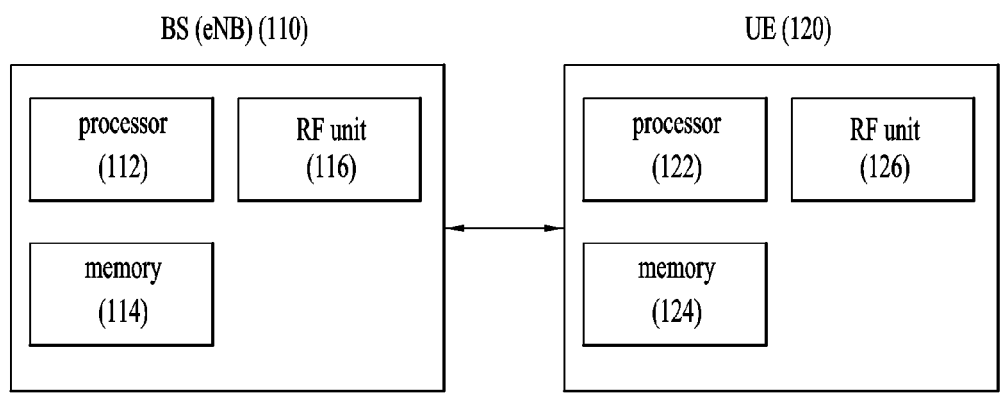
FIG. 15 illustrates a base station and a user equipment applicable to an embodiment of the present invention.

FIG. 15 illustrates a BS and a UE of a wireless communication system, which are applicable to embodiments of the present invention. When the wireless communication system includes a relay, the BS or UE can be replaced by the relay.

Referring to FIG. 15, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other apparatuses (e.g. a relay) of a wireless communication apparatus. Specifically, the present invention is applicable to a method for transmitting control information and an apparatus for the same.

What is claimed is:

1. A method of receiving control information by a user equipment in a wireless communication system, the method comprising:
    receiving a higher layer signal having first UL-DL (Uplink-Downlink) configuration information of a TDD (Time Division Duplex) cell;
    receiving a lower layer signal having second UL-DL configuration information of the TDD cell;
    receiving a DL signal in a subframe i of the TDD cell according to the second UL-DL configuration information; and
    detecting the control information on the basis of the number of PHICH (Physical Hybrid ARQ Indicator Channel) groups in the subframe i,
    wherein when the subframe i is a UL subframe according to the first UL-DL configuration information, a multiple used in determining the number of the PHICH groups is set to 1,
    wherein when the subframe i is a DL subframe according to the first UL-DL configuration information, the multiple used in determining the number of the PHICH groups is determined based on the first UL-DL configuration information, and wherein the number of the PHICH groups in the subframe i is given by $m_i \cdot N_{PHICH}^{group}$ and $$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases},$$

where $m_i$ denotes the multiple used in determining the number of the PHICH groups, Ng denotes a constant provided by a higher layer, and $N_{RB}^{DL}$ denotes the number of RBs (Resource Blocks) on a DL band.

2. The method of claim 1, wherein the multiple used in determining the number of the PHICH groups is determined according to the first UL-DL configuration information as follows:

| Uplink-downlink | Subframe number | | | | | | | | | |
| --- | --- | --- | --- | --- | --- | --- | --- | --- | --- | --- |
| configuration | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1. |

3. The method of claim 2, wherein subframes of the TDD cell are allocated according to a UL-DL configuration as follows:

| Uplink-downlink | Subframe number | | | | | | | | | |
| --- | --- | --- | --- | --- | --- | --- | --- | --- | --- | --- |
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

4. The method of claim 3, wherein the higher layer signal comprises an RRC (Radio Resource control) signal and wherein the lower layer signal comprises a PDCCH (Physical Downlink Control Channel) signal.

5. The method of claim 1, wherein the control information is received through a PDCCH.

6. The method of claim 1, wherein detecting the control information comprises monitoring PDCCH candidates on remaining resources except PHICH resources in the subframe i.

7. A user equipment configured to receive control information in a wireless communication system, comprising:
    an RF (Radio Frequency) unit;
    a processor,
    wherein a processor is configured to receive a higher layer signal having first UL-DL (Uplink-Downlink) configuration information of a TDD (Time Division Duplex) cell, receive a lower layer signal having second UL-DL configuration information of the TDD cell, receive a DL signal in a subframe i of the TDD cell according to the second UL-DL configuration information, and detect the control information on the basis of the number of PHICH (Physical Hybrid ARQ Indicator Channel) groups in the subframe i,
wherein when the subframe i is a UL subframe according to the first UL-DL configuration information, a multiple used in determining the number of the PHICH groups is set to 1,
wherein when the subframe i is a DL subframe according to the first UL-DL configuration information, the multiple used in determining the number of the PHICH groups is determined based on the first UL-DL configuration information, and
wherein the number of the PHICH groups in the subframe i is given by $m_i \cdot N_{PHICH}^{group}$ and $$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases},$$

where $m_i$ denotes the multiple used in determining the number of the PHICH groups, Ng denotes a constant provided by a higher layer, and $N^{DL}_{RB}$ denotes the number of RBs (Resource Blocks) on a DL band.

8. The user equipment of claim 7, wherein the multiple used in determining the number of the PHICH groups is determined according to the first UL-DL configuration information as follows:

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |

-continued

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1. |

9. The user equipment of claim 8, subframes of the TDD cell are allocated according to a UL-DL configuration as follows:

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

10. The user equipment of claim 9, wherein the higher layer signal comprises an RRC (Radio Resource control) signal and wherein the lower layer signal comprises a PDCCH (Physical Downlink Control Channel) signal.

11. The user equipment of claim 7, wherein the control information is received through a PDCCH.

12. The user equipment of claim 11, wherein detecting the control information comprises monitoring PDCCH candidates on remaining resources except PHICH resources in the subframe i.

\* \* \* \* \*